United States Patent

[11] 3,619,212

| [72] | Inventors | Kazuo Mori<br>Osaka;<br>Yasuo Yamamoto, Nara; Hideshi Noichi, Kyoto; Yuichi Fukuda, Kyoto, all of Japan |
|---|---|---|
| [21] | Appl. No. | 775,522 |
| [22] | Filed | Nov. 13, 1968 |
| [45] | Patented | Nov. 9, 1971 |
| [73] | Assignee | Nippon Shinyaku Co., Ltd.<br>Kyoto, Japan |
| [32] | Priority | Dec. 29, 1967 |
| [33] | | Japan |
| [31] | | 42/84848 |

[54] FOOD FLAVOR AND SPICE COMPOSITIONS AND THEIR PRODUCTION
7 Claims, No Drawings

[52] U.S. Cl. .................................................. 99/140 R
[51] Int. Cl. .................................................. A23l 1/22, A23l 1/26

[50] Field of Search ................................................. 99/140

[56] References Cited
UNITED STATES PATENTS

| 2,636,824 | 4/1953 | Ansel | 99/140 |
| 2,778,738 | 1/1957 | Fagen | 99/140 |
| 2,860,054 | 11/1958 | Yanick | 99/140 |
| 3,385,713 | 5/1968 | Levinson | 99/140 |

*Primary Examiner*—Morris O. Wolk
*Assistant Examiner*—Sidney Marantz
*Attorney*—Jacobs & Jacobs ABSTRACT: Process of manufacturing food flavor and spice compositions which includes absorbing flavors or spices onto an edible powder and suspending the resulting adsorbate in an edible liquid.

FOOD FLAVOR AND SPICE COMPOSITIONS AND THEIR PRODUCTION

The present invention concerns a novel process of manufacturing food flavors and spices and the products thereby produced.

In general food flavors and spices have been utilized in the following types or forms of products:

A. Natural food flavors and spice materials as they are (or after such processings as pulverization or drying) converted into fine powder for addition to foods.

B. Active principles separated or extracted from natural materials by suitable techniques or such active principles in concentrated form (extracts, essential oils, and oleoresins).

C. Those obtained as in section B or synthetic or imitation flavors suitably processed for convenient utilization, namely:

i. The extracts, essential oils, oleoresins, or synthetic flavors of section B dissolved in alcohol, propylene glycol or other solvent to make them readily dispersible when they are added to water (essences).

ii. Oleoresins, essential oils, and other materials that are insoluble in water emulsified in aqueous colloidal system by natural or synthetic high molecular weight compounds to make them readily dispersible in water (emulsion type).

iii. Essential oils and oleoresins admixed with an edible powder (table salt, sugars and others) for adsorption for convenient utilization (adsorption type).

iv. After essential oils and oleoresins are emulsified and dispersed in an aqueous solution of natural gum such as gum arabic, they are subjected to spray drying and other processing to achieve pulverization in the form of protecting oleoresins and other active principles by coating; this being the so-called "locked-in" type.

Such diversified types of formulation of food flavors and spices have been presently used in a variety of food products revealing characteristic advantages in specific utilization, but all of these types have disadvantages offsetting their advantages. Thus, in type A above deterioration of the natural products after harvesting and during and after drying and pulverization is rather extensive, and in addition the amount of the flavors and spices of this type to be added ordinarily to foods is relatively large so that the appearance value of the added food products is often spoiled. Another detriment is that due to being a natural product the contents of the components are not always constant but are likely to vary. In type B above greater parts of the food flavors and spices belonging to this type are so insoluble in water that they are not convenient for use. Such oleoresins with low solubilities in alcohols can not largely be made into the type C-i of formulation and this type has only limited fields of application. Food flavors and spices of the type C-ii are convenient in utilization but the stability of the emulsions on long standing constitute problems. In the type C-iii, flavors and spices are exposed to air so that they are liable to be lost by vaporization into the air or deteriorated by oxidation of air. The type C-iv provides stable formulation of active principles under protective coating, but it may be harmed by deterioration due to absorption of moisture, and another weakness is that a specific, large scale apparatus is required for the production of this type of food flavors and spices resulting in increased cost.

The present invention derives from extended studies on the formulation of food flavors and spices, or their forms of utilization, and resulting in a novel type of formulation which on actual addition to foods reveals merits over other types of formulations coupled with freedom from their shortcomings.

Procedure for the manufacturing feature of the present invention is as follows: Edible powder in general or powder of natural food flavors or natural spices is utilized as a carrier and this is admixed and made to adsorb extracts or oleoresins obtained from natural flavors and natural spices, or synthetic flavors, and, if desired, other additives, to make a powder or paste. This is suspended in a solvent in which it is substantially insoluble and is soluble in water. As such solvents propylene glycol, glycerol, sugar syrup, sorbitol solution, and others may be used. The adsorbed matter is covered by a substance that does not dissolve it nor is soluble in it, and individual carriers are present in the solution in a state of suspension avoiding direct contact with air so that the active principles are not lost into the air, oxidation by air can be prevented, and when added to water or to foods the active principles become dispersed promptly.

By this process a formulation may be manufactured which possesses several times as great power as the natural flavors and spices, is free from off-flavor and other deteriorations, and is convenient to use.

Some results of the addition of the flavors and spices formulated by the process of the present invention and of those obtained by the previously known processes in foods are given below.

Experiment I (Addition to fish meat paste product)

Four forms of pepper, namely, natural pepper powder, a pepper emulsion obtained by emulsifying extract of pepper or the oleoresin, a powdered pepper prepared by emulsifying and spray-drying the oleoresin in conventional manner, and the pepper paste formulated by the process of the present invention as explained in example 1 which is shown below, all of them being made to contain an equal amount of the essential oil and resinous substance that contains piperine, the active principle, were added directly to fish sausage (formulated according to the formula of general commercial fish sausage) and the strength of the taste and flavor of pepper was compared to each other by organoleptic technique (the ranking method using 4 samples; the panel consisting of 20 persons). The results on the strength of the taste perceptible at eating are as follows:

|  | Sum of the score, larger numbers signifying lesser strengths |
|---|---|
| Natural pepper powder | 50 |
| Pepper emulsion | 63 |
| Powdered pepper (spray-dried) | 51 |
| Paste pepper | 36 |

From the above results it is clear that the pepper paste obtained by the process of the present invention gives stronger pepper taste than other formulations by a significant difference.

Experiment II (Addition to cream)

Similarly to experiment I, 3 samples were made up of different formulations of orange oil, namely, 1. Orange emulsion obtained by emulsifying,
2. Powdered orange flavor obtained by spray-drying, and
3. Orange flavor paste obtained as in example II below, were added to the cream for chou so as to make the content of the orange oil the same in all, and after thorough mixing the strength of the orange flavor at eating was compared with each other by the organoleptic method. The sums of the score of decreasing order (the ranking method using 3 samples; panel consisting of 18 persons) are as follows:

| 1. Emulsified flavor | 45 |
|---|---|
| 2. Powdered flavor | 37 |
| 3. Flavor paste by the present process | 26 |

From the above results it is found that stronger flavor is perceived in the product made according to the process of the present invention than in other products. The above two experiments make it clear in reference to dispersion of the active principles of food flavors and spices in foods that dispersion of them homogeneous at the macroscopic level but somewhat heterogeneous at the microscopic level, like in the formulation of the present invention, or the presence of the active principles of food flavors and spices in foods in relatively large granular forms produces a strong psychological effect at eating them due to the difference in the physically stimulating effects of the principles, in comparison with other formulations containing identical amounts of the active principles This fact provides the present invention with its most prominent characteristic.

In reference to the fact that the formulation made by the process of the present invention is a stable product of food flavors and spice, another experiment is explained below 1. A powder of crystalline cellulose onto which the active principle is adsorbed (adsorption type).

2. A powder made by emulsifying the active principle in an aqueous solution of natural gum and then spray-drying by the conventional technique (powdered flavor).

3. A formulation made according to the description of example III. Specifically, 15 parts of monoglyceride is admixed with 50 parts of mustard oil containing extract of red pepper, which mixture is adsorbed onto 200 parts of powdered natural mustard and this product is then homogeneously admixed in 200 parts of propylene glycol to give a mustard paste.

With these 3 types of formulations, samples were made so as to contain identical amounts of orange oil, sealed in polyethylene films of identical size and thickness, allowed to stand in a dark room at room temperature, and then the amounts of the residual essential oil or steam volatile oil in them determined. The results are as follows (the values obtained immediately after manufacturing the samples were made 100 percent in each sample):

|  | Percent | | |
| --- | --- | --- | --- |
|  | Immediately after manufacture | After 5 days | After 30 days |
| (1) Adsorbed flavor | 100 | 70 | 42 |
| (2) Powdered flavor (coated or "locked in") | 100 | 98 | 97 |
| (3) Paste flavor (by this invention) | 100 | 98 | 95 |

It may also be added that after standing for 30 days oxidative deterioration was observed in orange oil in the sample of (1) adsorption type while it was never observed in either of the samples of (2) and (3).

The above results indicate that the product of the present invention is excellent and comparable to the locked-in-type formulation made by spray-drying with reference to the stability on preservation.

Below are given some examples of manufacturing food flavors and spices by the process of the present invention for more factual explanation, but the invention is not limited by these examples.

EXAMPLE I

To 100 parts of natural pepper powder are added 50 parts of a pepper oleoresin which has been prepared separately, and to make them completely adsorbed, both are admixed and kneaded under warming.

The adsorbed product of pepper here obtained in coarse powder or in muddy paste is thoroughly admixed, after cooling, with 100 parts of sorbitol solution or propylene glycol or others to produce a paste-form pepper

EXAMPLE II

To 100 parts of crystalline cellulose are added 15 parts of orange oil and both are well kneaded. To the orange oil-adsorbing product obtained are further added 100 parts of sorbitol solution and the mixture thoroughly kneaded to give a pasty orange flavoring.

EXAMPLE III

To 50 parts of monoglyceride are admixed and dissolved 50 parts of mustard oil containing extract of red pepper, the mixture kneaded for adsorption with 200 parts of powdered natural mustard, and then the product homogeneously admixed in 200 parts of propylene glycol to give a mustard paste in the form of "jam" which has a long shelf-life.

What is claimed is:

1. A process of manufacturing food flavor and spice compositions which comprises (1) admixing and adsorbing flavor ingredients selected from the group consisting of extracts of food flavors and spices or synthetic or imitation flavors onto an edible powder of a bland nature or powders of natural food flavors and spices and (2) suspending the resulting mixture in an edible liquid in which the mixture is substantially mutually insoluble.

2. A process according to claim 1 wherein natural pepper powder is added to separately prepared pepper oleoresin to form an adsorbate, admixing and kneading this adsorbate under warming and forming a pepper flavor suspension therefrom by mixing the adsorbed product after cooling with an edible liquid selected from the group consisting of sorbitol solution or propylene glycol solution.

3. A process according to claim 1 wherein crystalline cellulose is added to orange oil and kneaded therewith, sorbitol solution is added to the adsorbate and the resulting mixture thoroughly kneaded to produce an orange flavoring product.

4. A process according to claim 1 wherein mustard oil containing red pepper extract are added to monoglyceride, the resulting mixture adsorbed onto natural powdered mustard and the product thereby produced admixed with propylene glycol to form a jam-type mustard paste.

5. A food flavor or spice formulation of enhanced flavoring or spice power and stability obtained by the process of claim 1.

6. A process according to claim 1 wherein adsorbed matter is covered by an edible liquid polyhydric alcohol which does not dissolve it and it not soluble in it.

7. A process according to claim 6 wherein orange oil is sealed in an edible sorbital film.

* * * * *